US012798644B2

(12) United States Patent
Luo

(10) Patent No.: US 12,798,644 B2
(45) Date of Patent: Nov. 17, 2026

(54) FOLDABLE CART

(71) Applicant: Phaeton Manufacturing LLC, Nantong (CN)

(72) Inventor: Xiong Luo, Nantong (CN)

(73) Assignee: Phaeton Manufacturing LLC, Nantong (CN)

( * ) Notice: Subject to any disclaimer, the term of this patent is extended or adjusted under 35 U.S.C. 154(b) by 314 days.

(21) Appl. No.: 18/680,074

(22) Filed: May 31, 2024

(65) Prior Publication Data

US 2025/0249945 A1 Aug. 7, 2025

(30) Foreign Application Priority Data

Feb. 1, 2024 (CN) ......................... 202410144765.6

(51) Int. Cl.

| | |
|---|---|
| ***B62B 3/02*** | (2006.01) |
| ***B62B 3/10*** | (2006.01) |
| ***B62B 5/04*** | (2006.01) |
| ***B62B 5/06*** | (2006.01) |

(52) U.S. Cl.

CPC ................ *B62B 3/02* (2013.01); *B62B 3/106* (2013.01); *B62B 5/0433* (2013.01); *B62B 5/048* (2013.01); *B62B 5/067* (2013.01); *B62B 2205/06* (2013.01); *B62B 2501/00* (2013.01)

(58) Field of Classification Search

CPC ........... B62B 3/02; B62B 3/106; B62B 3/025; B62B 3/007; B62B 3/00; B62B 5/0433; B62B 5/048; B62B 5/067; B62B 5/0461; B62B 5/04; B62B 5/06; B62B 2205/06; B62B 2205/104; B62B 2301/05

See application file for complete search history.

(56) References Cited

U.S. PATENT DOCUMENTS

| | | | | |
|---|---|---|---|---|
| 8,973,716 | B2 * | 3/2015 | McKay | B62B 5/04 188/31 |
| 8,973,940 | B2 * | 3/2015 | Chen | B62B 3/02 280/638 |
| 9,896,118 | B2 * | 2/2018 | Choi | B62B 3/007 |
| 9,950,727 | B1 * | 4/2018 | Pang | B62B 3/001 |
| 10,272,937 | B2 * | 4/2019 | Chen | B62B 5/0003 |
| 10,562,556 | B1 * | 2/2020 | Horowitz | B62B 5/064 |
| 10,633,010 | B1 * | 4/2020 | Zhang | B62B 3/025 |
| 11,091,183 | B2 * | 8/2021 | Wu | B62B 3/007 |
| 11,247,708 | B2 * | 2/2022 | Wang | B62B 3/025 |
| 11,518,423 | B2 * | 12/2022 | Zhang | B62B 5/067 |

(Continued)

*Primary Examiner* — James M Dolak

(74) *Attorney, Agent, or Firm* — Wang Law Firm, Inc.

(57) ABSTRACT

The foldable cart has a pulling rod assembly, a foldable cart frame, a plurality of wheels and a storage bag. The foldable cart frame has a front frame, a rear frame, two foldable fence assemblies and a foldable bottom supporting assembly. A front connecting bar is connected to a bottom of the front frame, and a bottom end of the pulling rod assembly is rotatably connected to a middle portion of the front connecting bar. The number of the wheels is four, two wheels are a pair of front universal wheels and two wheels are a pair of rear directional wheels, the two front universal wheels detachably connect to the front connecting bar; the rear frame has a pair of mounting blocks disposed on a bottom of the rear frame, and each rear directional wheel detachably connects to a corresponding mounting block.

9 Claims, 9 Drawing Sheets

(56) References Cited

U.S. PATENT DOCUMENTS

| | | | | |
|---|---|---|---|---|
| 11,958,520 | B1 * | 4/2024 | Sun | B62B 3/007 |
| 12,128,940 | B2 * | 10/2024 | Sun | B62B 3/007 |
| 12,365,377 | B2 * | 7/2025 | Sun | B62B 3/02 |
| 12,606,226 | B2 * | 4/2026 | Luo | B62B 3/022 |
| 12,722,677 | B2 * | 9/2026 | Cheng | B62B 3/007 |
| 12,722,680 | B2 * | 9/2026 | Wu | B62B 3/025 |
| 2015/0145224 | A1 * | 5/2015 | Zhu | B62B 3/007 280/42 |

* cited by examiner

FOLDABLE CART

TECHNICAL FIELD OF THE INVENTION

The present invention relates to a field of transportation tools, and relates to a cart, in particular to a foldable cart.

BACKGROUND OF THE INVENTION

As a kind of transportation tool commonly used in the daily life, hand carts are mainly classified into hand carts for shopping and hand carts for transportation, where the hand carts for shopping are used in some occasions, for example, when people go shopping, hang out. Each cart comprises a cart frame, a plurality of casters and a pair of bearings. The hand carts for transportation refer to agricultural transportation tools, and mainly comprise three components, i.e., a plurality of wheels, a cart frame and a brake mechanism. With the improvement of people's living standard, activities such as family shopping, self-driving tour and camping are getting popular. Thus, hand carts are widely used in outdoor places such as squares, beaches, parks, and courtyards, bringing convenience for people to carry a large number of activity materials. However, common hand carts are large, non-foldable and inconvenient to carry and store. Therefore, foldable hand carts are rolled out for the convenience of storage in the present market.

The design of existing hand carts in the market cannot solve all the problem of low structural strength, large space size and large packaging size at the same time, only can solve one or two of these problems. In other words, hand carts with high strength and large space are basically large in packaging size, so that the transportation cost is high and ultimately borne by consumers.

Upon examination, a Chinese Patent CN217553949U (Patent No.; CN202221606025.2) disclosed a foldable cart, comprising a hand lever and a cart frame, wherein a plurality of wheels are arranged under the cart frame; the cart frame comprises bottom cart frame and upper cart frame; the bottom cart frame and the upper cart frame are connected through a plurality of vertical rods; a middle rod is arranged in a middle of the bottom cart frame; and, a folding mechanism for folding the cart frame is arranged at two ends of the middle rod. The cart can be easily folded to satisfy the use requirements, but is inconvenient to operate and not small enough after being folded and cannot adjust casters, so that the flexibility in use is not unsatisfactory.

SUMMARY OF THE INVENTION

It is an object of the present invention to provide a foldable cart, which is reasonable in structure and convenient to operate.

For achieving the above object, the foldable cart comprises a pulling rod assembly; a foldable cart frame having a first side and a second side; a plurality of wheels connected to the cart frame; a storage bag connected to the cart frame; wherein, the foldable cart frame comprises a front frame, a rear frame, two foldable fence assemblies respectively at the first side and the second side of the foldable cart frame and a foldable bottom supporting assembly having a front end and a rear end, the front frame and the rear frame are respectively connected to the front end and the rear end of the bottom supporting assembly; the bottom supporting assembly comprises a front supporting frame and a rear supporting frame which are pivoted together; each foldable fence assembly has a front end which is pivoted to the front frame and a rear end which is pivoted to the rear frame, the two fence assemblies are driven to fold or unfold when the bottom supporting assembly is folded or unfolded; a front connecting bar is connected to a bottom of the front frame, and a bottom end of the pulling rod assembly is rotatably connected to a middle portion of the front connecting bar.

As an improvement, each of the front frame and the rear frame has an inverted U-shape, and has a cross rod and two vertical rods which are respectively connected to one end of the cross rod on left and right sides of the frame cart corresponding to an aforementioned cross rod; the front supporting frame and the rear supporting frame of the bottom supporting assembly are capable of unfolding into a rectangle supporting plane when the foldable cart is in an unfolded state; each vertical rod has a first mounting hole at a bottom end of the vertical rod, and each of the front supporting frame and the rear supporting frame has two corresponding second mounting holes which connect to a corresponding vertical rod, a plurality of connecting members respectively connects to the first mounting hole of one vertical rod and one corresponding second mounting hole of the front supporting frame or the rear supporting frame, so as to pivotally connect two vertical rods of the front frame to the front supporting frame, and pivotally connect two vertical rods of the rear frame to the rear supporting frame.

Preferably, each fence assembly comprises two long ribs, two short ribs and two branch ribs, a top block is arranged at a top of each vertical rod of the front frame and the rear frame, a slider being capable of moving along the vertical rod is sleeved on each vertical rod, a top end of each long rib is pivoted to a middle disc and a bottom end thereof is pivoted to the slider, a bottom end of each short rib is pivoted to a corresponding lower middle disc and an top end thereof is pivoted to corresponding long rib, an oblique connecting block being capable of moving along the short rib is sleeved on each short rib, a top end of each branch rib is pivoted to the top block and a bottom end thereof is pivoted to the oblique connecting block, a middle portion of each branch rib is pivoted to a corresponding long rib.

Preferably, each lower middle disc has a connecting hole on a surface of the lower middle disc, a bottom connecting bar is arranged below a middle portion of the bottom supporting assembly, two ends of the bottom connecting bar penetrate through the connecting holes of the lower middle discs, respectively, so as to connect the left and right fence assemblies, such that when the cart frame is fully unfolded, a bottom end of the bottom supporting assembly resists against the bottom connecting bar.

Preferably, the front connecting bar comprises a long tube having two right-angle blocks, a U-shaped clip and two vertical tubes welded on a surface of the long tube, the two right-angle blocks are welded on a left and right side of the long tube, respectively, each right-angle block connects to the bottom end of the corresponding vertical rod of the front frame, the U-shaped clip is welded below a middle portion of the long tube and a clip jaw is welded upon the middle portion of the long tube, a bottom end of the pulling rod assembly is pivoted to the U-shaped clip and positioned by the clip jaw, the two vertical tubes are welded on the long tube at positions between each right-angle block and the U-shaped clip, respectively; a shaft sleeve for mounting a corresponding front universal wheel is inserted into each vertical tube, each vertical tube has a cap at a top of the vertical tube and each cap buckles the corresponding shaft sleeve by a buckle on the corresponding shaft sleeve.

Preferably, the pulling rod assembly comprises a pulling rod joint, an outer tube, an inner tube and a pulling handle, the pulling handle fixedly connects to a top of the inner tube, the pulling rod joint fixedly connects to a bottom of the outer tube, the pulling rod assembly is pivoted to the U-shaped clip of the front connecting bar through the pulling rod joint, the inner tube is movably sheathed inside the outer tube, and, a locking mechanism is arranged between the inner tube and the outer tube.

Preferably, the locking mechanism comprises a buckle arranged on a surface of the bottom of the inner tube, the buckle has a step hole for allowing a jumping bean to pass through at a surface of the buckle, the inner tube has a through hole for allowing the jumping bean to pass through a surface of the inner tube, and the outer tube has a positioning hole for allowing the jumping bean to pass through a surface of a top end of the outer tube, a spring is supported between the jumping bean and the step hole of the buckle, urging the jumping beam to extend out of the positioning hole to lock the inner tube with the outer tube, a button for opening the locking mechanism is mounted on the top end of the outer tube, the button is sleeved on the top end of the outer tube and connects to the outer tube through a boss, one side of the button extends downward to form a button portion, and, the button portion on the surface of the outer tube corresponds to the position of the jumping bean.

Preferably, the number of the wheels is four, two wheels are a pair of front universal wheels and two wheels are a pair of rear directional wheels, the two front universal wheels detachably connect to the front connecting bar; the rear frame has a pair of mounting blocks disposed on a bottom of the rear frame, and each rear directional wheel detachably connects to a corresponding mounting block.

Preferably, each front universal wheel comprises a universal wheel, a U-shaped universal wheel fork with two prongs, a pair of bearings and a brake mechanism; the bearings are mounted inside a bearing hole formed at a center of the universal wheel; the brake mechanism comprises a U-shaped brake pedal with two prongs and a pair of brake buckles, each brake buckle is sleeved on one of two opposite sides of the universal wheel, the brake pedal is connected to the pair of brake buckles; the universal wheel fork has two punched holes each arranged at a bottom of each prong of the universal wheel fork, the universal wheel, the pair of bearings, the brake buckle and the brake pedal are coaxially connected to the universal wheel fork between the pair of punched holes; a rotating shaft having an annular groove is disposed on a top of the universal wheel fork, a C-shaped clamping ring clamps into the annular groove of the rotating shaft, and each front universal wheel is inserted into the shaft sleeve of the corresponding vertical tube through the rotating shaft of the aforementioned front universal wheel; each brake buckle has a positioning pore at a top of the brake buckle, and the universal wheel fork has two corresponding connecting pores each arranged at a bottom of each prong of the universal wheel fork, so that each brake buckle connects to each corresponding prong of the universal wheel fork through a connecting member connecting to on positioning pore and the corresponding connecting pore.

Preferably, each rear directional wheel comprises a directional wheel, a U-shaped directional wheel fork with two prongs and a pair of bearings; the bearings are mounted inside a bearing hole formed at a center of the directional wheel; the directional wheel fork has two punched holes each arranged at a bottom of each prong of the directional wheel fork, the directional wheel, the pair of bearings are coaxially connected to the directional wheel fork between the pair of punched holes; a polygonal rotating shaft having an annular groove is disposed on a top of the directional wheel fork, a clamping ring clamps into the annular groove of the polygonal rotating shaft; each mounting block is sleeved on the bottom of each vertical rod of the rear frame, a positioning shaft sleeve for allowing the polygonal rotating shaft to pass through is located inside each corresponding mounting block, and, each rear directional wheel passes through the polygonal rotating shaft to be inserted and positioned into the positioning shaft sleeve of the corresponding mounting block.

Preferably, the storage bag is detachably stretched on the cart frame and fixed to top blocks on the front frame and the rear frame.

Compared with the prior art, the present invention has the following advantages. The front supporting frame and the rear supporting frame are connected to form the bottom supporting assembly, which is simple in structure and convenient to fold. The two fence assemblies are driven to fold or unfold when the bottom supporting assembly is folded or unfolded. The casters are easy to mount, two of the casters are front universal wheels, while the other two thereof are rear directional wheels; and the brake mechanism are arranged on the front universal wheels, so that it is more convenient and flexible to operate. During packaging and transportation, two wheels can be placed in an included angle of the folding bottom supporting assembly, and the other two wheels are placed under the bottom connecting bar flatwise, so that the packaging size of the cart is minimized. Moreover, the inner tube and the outer tube of the pulling rod assembly are retractable, and are convenient and firm for positioning. The foldable cart of the present invention is simple and reasonable in structure, flexible and convenient to operate and use, small in size after folded and convenient to store and carry, and has advantages of small-size packaging, large capacity and high structural strength at the same time.

DETAILED DESCRIPTION OF THE INVENTION

Figure 1:
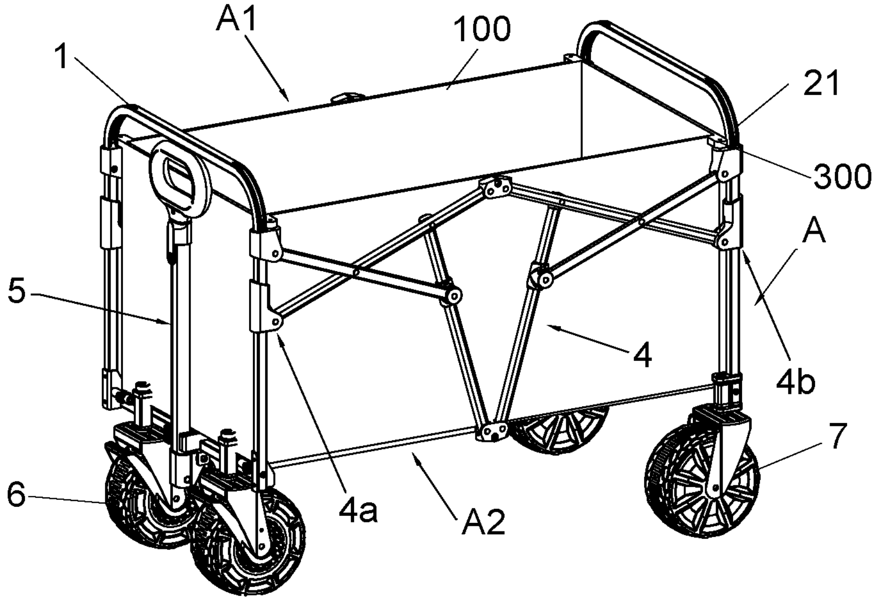
FIG. 1 is a perspective view of a foldable cart according to an embodiment of the present invention.

The present invention will be further described below in detail by embodiments with reference to the accompanying drawings.

FIGS. 1-19 show a preferred embodiment of a foldable cart of the present invention. The foldable cart comprises a pulling rod assembly 5; a foldable cart frame A having a first side and a second side; a plurality of wheels 6, 7 connected to the cart frame A; a storage bag 100 connected to the cart frame A; wherein, the foldable cart frame A comprises a front frame 1, a rear frame 2, two foldable fence assemblies 4 respectively at the first side and the second side of the foldable cart frame A and a foldable bottom supporting assembly 3 having a front end and a rear end, the front frame 1 and the rear frame 2 are respectively connected to the front end and the rear end of the bottom supporting assembly 3; the bottom supporting assembly 3 comprises a front supporting frame 31 and a rear supporting frame 31 which are pivoted together; each foldable fence assembly 4 has a front end which is pivoted to the front frame 1 and a rear end which is pivoted to the rear frame 2, the two fence assemblies 4 are driven to fold or unfold when the bottom supporting assembly 3 is folded or unfolded; a front connecting bar 8 is connected to a bottom of the front frame 1, and a bottom end of the pulling rod assembly 5 is rotatably connected to a middle portion of the front connecting bar 8. The number of the wheels 6,7 is four, two wheels are a pair of front universal wheels 6 and two wheels are a pair of rear directional wheels 7, the two front universal wheels 6 detachably connect to the front connecting bar 8; the rear frame 2 has a pair of mounting blocks 20 disposed on a bottom of the rear frame 2, and each rear directional wheel 7 detachably connects to a corresponding mounting block 20.

Figure 3:
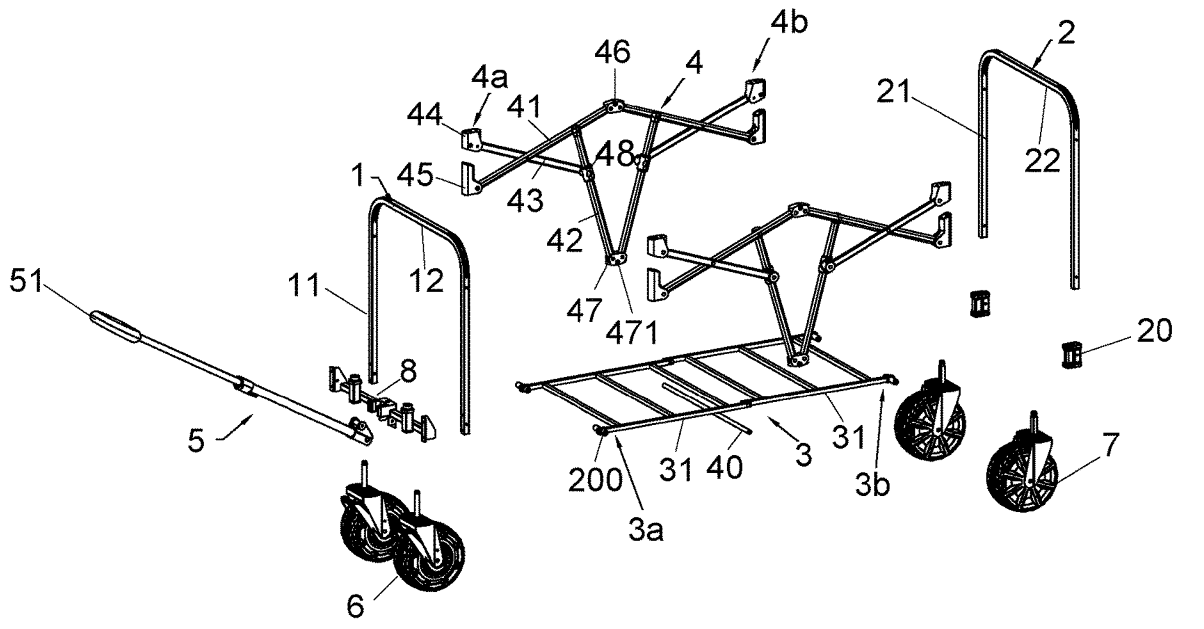
FIG. 3 is an exploded view of the FIG. 2.
Figure 4:
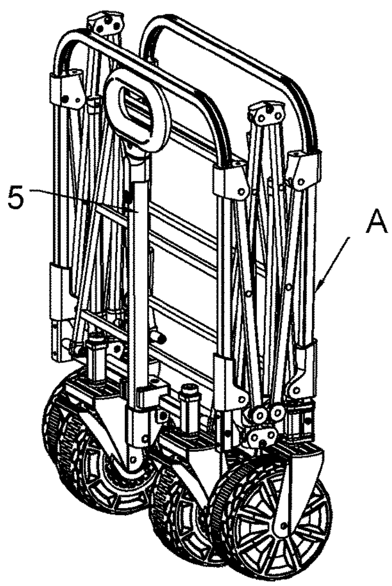
FIG. 4 is a perspective view of the foldable cart according to the embodiment of the present invention when in a folded state.

Specifically, as shown in FIG. 3, each of the front frame 1 and the rear frame 2 has an inverted U-shape, and has a cross rod 12, 22 and two vertical rods 11, 21 which are respectively connected to one end of the cross rod 12, 22 on left and right sides of the frame cart A corresponding to an aforementioned cross rod 12, 22; each of the front supporting frame 31 and the rear supporting frame 31 is a rectangle, the front supporting frame 31 and the rear supporting frame 31 of the bottom supporting assembly 3 are capable of unfolding into a rectangle supporting plane when the foldable cart is in an unfolded state; each vertical rod 11, 21 has a first mounting hole at a bottom end of the vertical rod 11, 21, and each of the front supporting frame 31 and the rear supporting frame 31 has two corresponding second mounting holes which connect to a corresponding vertical rod 11, 21, a plurality of connecting members 200 respectively connects to the first mounting hole of one vertical rod and one corresponding second mounting hole of the front supporting frame 31 or the rear supporting frame 31, so as to pivotally connect two vertical rods 11 of the front frame 1 to the front supporting frame 31, and pivotally connect two vertical rods 21 of the rear frame 2 to the rear supporting frame 31.

Figure 2:
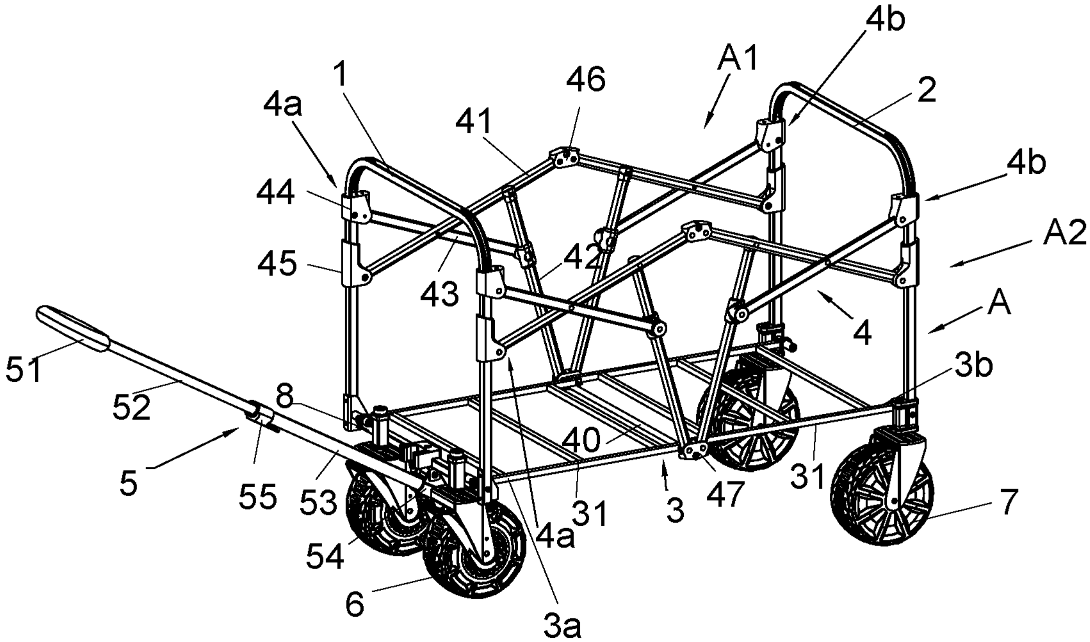
FIG. 2 is a perspective view of the foldable cart according to the embodiment of the present invention when a storage bag is removed and the pulling rod assembly is in an extended state.

As shown in FIGS. 2-3, each fence assembly 4 comprises two long ribs 41, two short ribs 42 and two branch ribs 43, a top block 44 is arranged at a top of each vertical rod 11,21 of the front frame 1 and the rear frame 2, a slider 45 being capable of moving along the vertical rod 11,21 is sleeved on each vertical rod 11,21, a top end of each long rib 41 is pivoted to a middle disc 46 and a bottom end thereof is pivoted to the slider 45, a bottom end of each short rib 42 is pivoted to a corresponding lower middle disc 47 and an top end thereof is pivoted to corresponding long rib 41, an oblique connecting block 48 being capable of moving along the short rib 42 is sleeved on each short rib 42, a top end of each branch rib 43 is pivoted to the top block 44 and a bottom end thereof is pivoted to the oblique connecting block 48, a middle portion of each branch rib 43 is pivoted to a corresponding long rib 41. Each lower middle disc 47 has a connecting hole 471 on a surface of the lower middle disc 47, a bottom connecting bar 40 is arranged below a middle portion of the bottom supporting assembly 3, two ends of the bottom connecting bar 40 penetrate through the connecting holes 471 of the lower middle discs 47, respectively, so as to connect the left and right fence assemblies 4, such that when the cart frame A is fully unfolded, a bottom end of the bottom supporting assembly 3 resists against the bottom connecting bar 40. Thus, the bottom connecting bar 40 can support the bottom supporting assembly 3 after the cart frame A is unfolded, thereby enabling positioning and increasing the loading capacity of the cart frame A.

Figure 9:
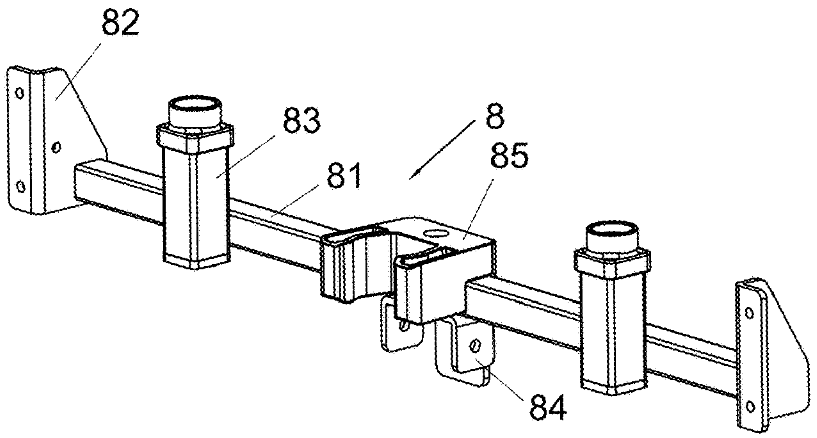
FIG. 9 is a perspective view of a front connecting bar according to the embodiment of the present invention.
Figure 10:
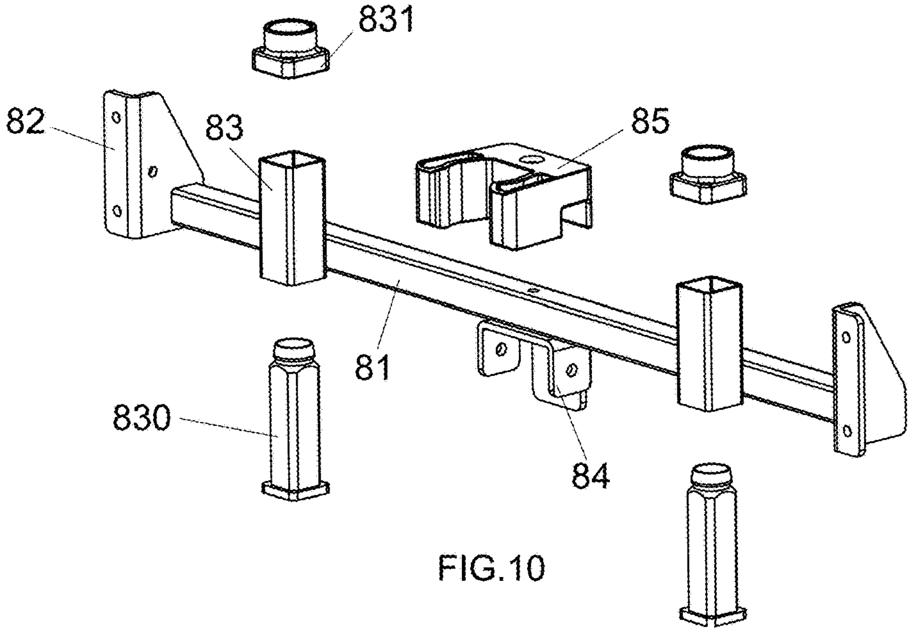
FIG. 10 is an exploded view of the FIG. 9.
Figure 11:
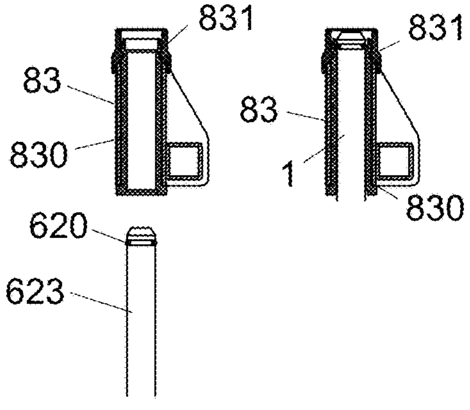
FIG. 11 shows two sectional views of a vertical tube and a rotating shaft of a front universal wheel in FIG. 9 when they are apart and mounted together.

As shown in FIGS. 9-10, the front connecting bar 8 comprises a long tube 81 having two right-angle blocks 82, a U-shaped clip 84 and two vertical tubes 83 welded on a surface of the long tube 81, the two right-angle blocks 82 are welded on a left and right side of the long tube 81, respectively, each right-angle block 82 connects to the bottom end of the corresponding vertical rod 11 of the front frame 1, the U-shaped clip 84 is welded below a middle portion of the long tube 81 and a clip jaw 85 is welded upon the middle portion of the long tube 81, a bottom end of the pulling rod assembly 5 is pivoted to the U-shaped clip 84, when the pulling rod assembly is in a vertical state, that is, when it is not used, the bottom end of the pulling rod assembly 5 can be positioned by the clip jaw 85, the two vertical tubes 83 are welded on the long tube 81 at positions between each right-angle block 82 and the U-shaped clip 84, respectively; a shaft sleeve 830 for mounting a corresponding front universal wheel 6 is inserted into each vertical tube 83, each vertical tube 83 has a cap 831 at a top of the vertical tube 83, a clamping ring is arranged in the cap 831, the shaft sleeve 830 has a corresponding annular groove at a top of the shaft sleeve 830, and each cap 831 buckles the corresponding shaft sleeve 830 by a buckle on the corresponding shaft sleeve 830.

Figure 17:
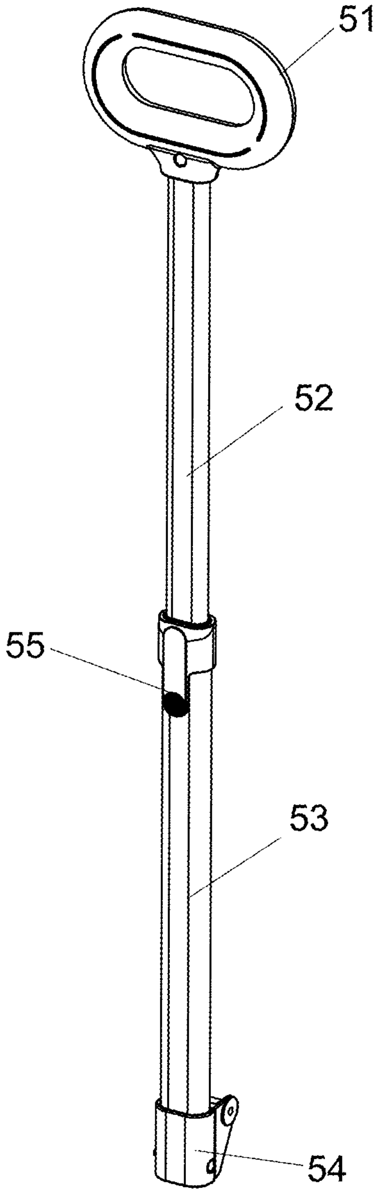
FIG. 17 is a perspective view of the pulling rod assembly according to the embodiment of the present invention.
Figure 18:
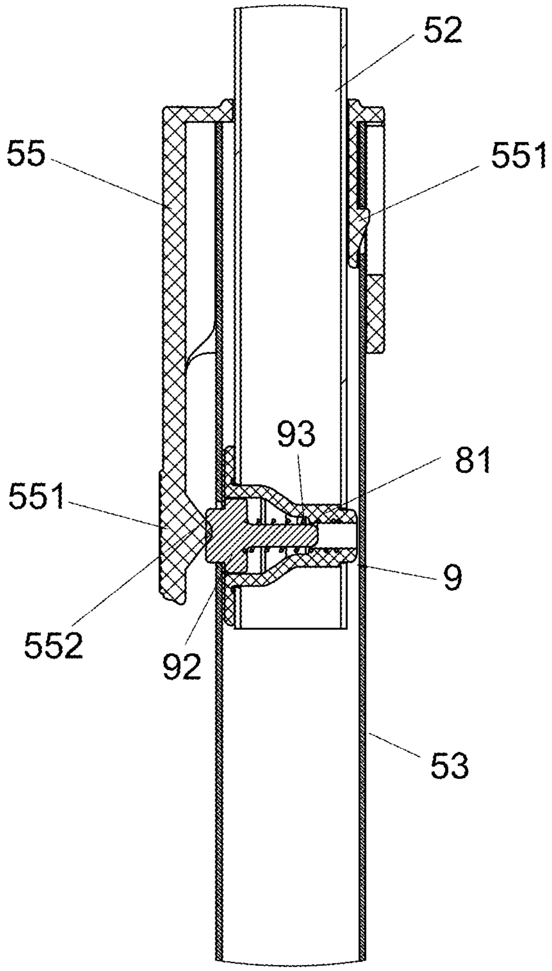
FIG. 18 is a sectional view of a part of a locking mechanism of the pulling rod assembly.
Figure 19:
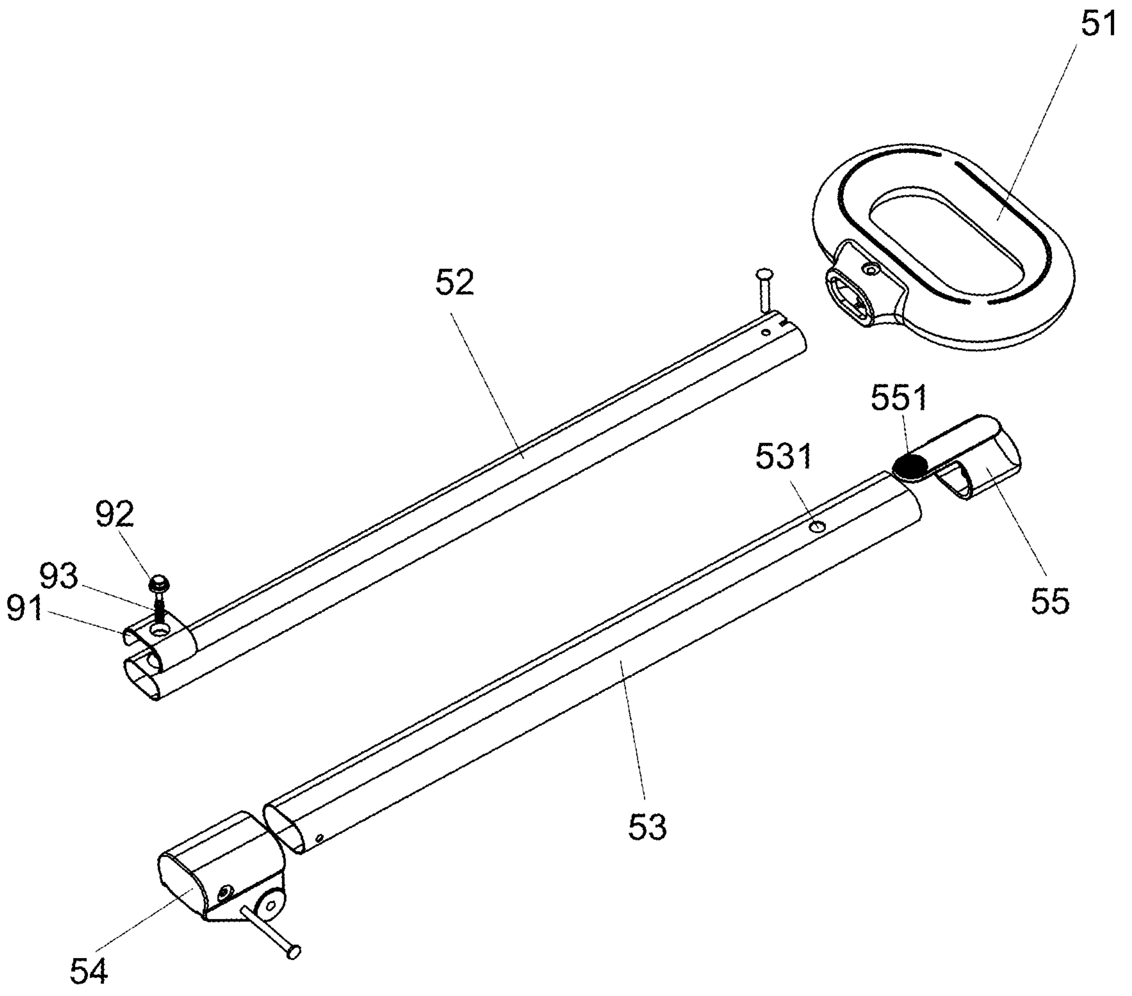
FIG. 19 is an exploded view of the pulling rod assembly according to the embodiment of the present invention.

As shown in FIGS. 17-19, the pulling rod assembly 5 comprises a pulling rod joint 54, an outer tube 53, an inner tube 52 and a pulling handle 51, the pulling handle 51 fixedly connects to a top of the inner tube 52, the pulling rod joint 54 fixedly connects to a bottom of the outer tube 53, the pulling rod assembly 5 is pivoted to the U-shaped clip 84 of the front connecting bar 8 through the pulling rod joint 54, the inner tube 52 is movably sheathed inside the outer tube 53, and, a locking mechanism 9 is arranged between the inner tube 52 and the outer tube 53, the locking mechanism 9 comprises a buckle 91 arranged on a surface of the bottom of the inner tube 52, the buckle 91 has a step hole for allowing a jumping bean 92 to pass through at a surface of the buckle 91, the inner tube 52 has a through hole for allowing the jumping bean 92 to pass through a surface of the inner tube 52, and the outer tube 52 has a positioning hole 531 for allowing the jumping bean 92 to pass through a surface of a top end of the outer tube 53, a spring 93 is supported between the jumping bean 92 and the step hole of the buckle 91, urging the jumping beam 92 to extend out of the positioning hole 531 to lock the inner tube 52 with the outer tube 53, a button 55 for opening the locking mechanism 9 is mounted on the top end of the outer tube 53, the button 55 is sleeved on the top end of the outer tube 53 and connects to the outer tube 53 through a boss, one side of the button 55 extends downward to form a button portion 551, and, the button portion 551 on the surface of the outer tube 53 corresponds to the position of the jumping bean 92. The button portion 551 has a conical protrusion 552 which is used for squeezing the jumping bean 92 inward on an inner side of the button portion 551.

Figure 12:
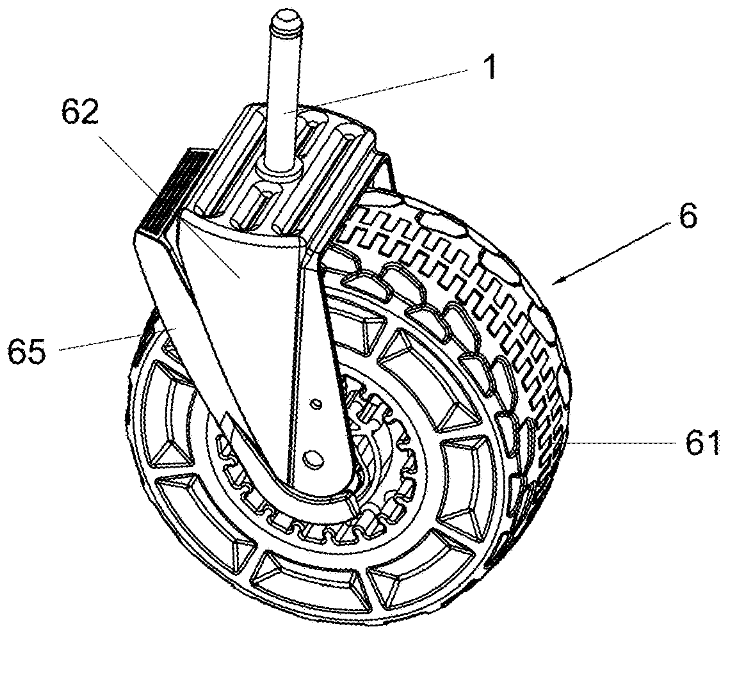
FIG. 12 is a perspective view of the front universal wheel according to the embodiment of the present invention.
Figure 13:
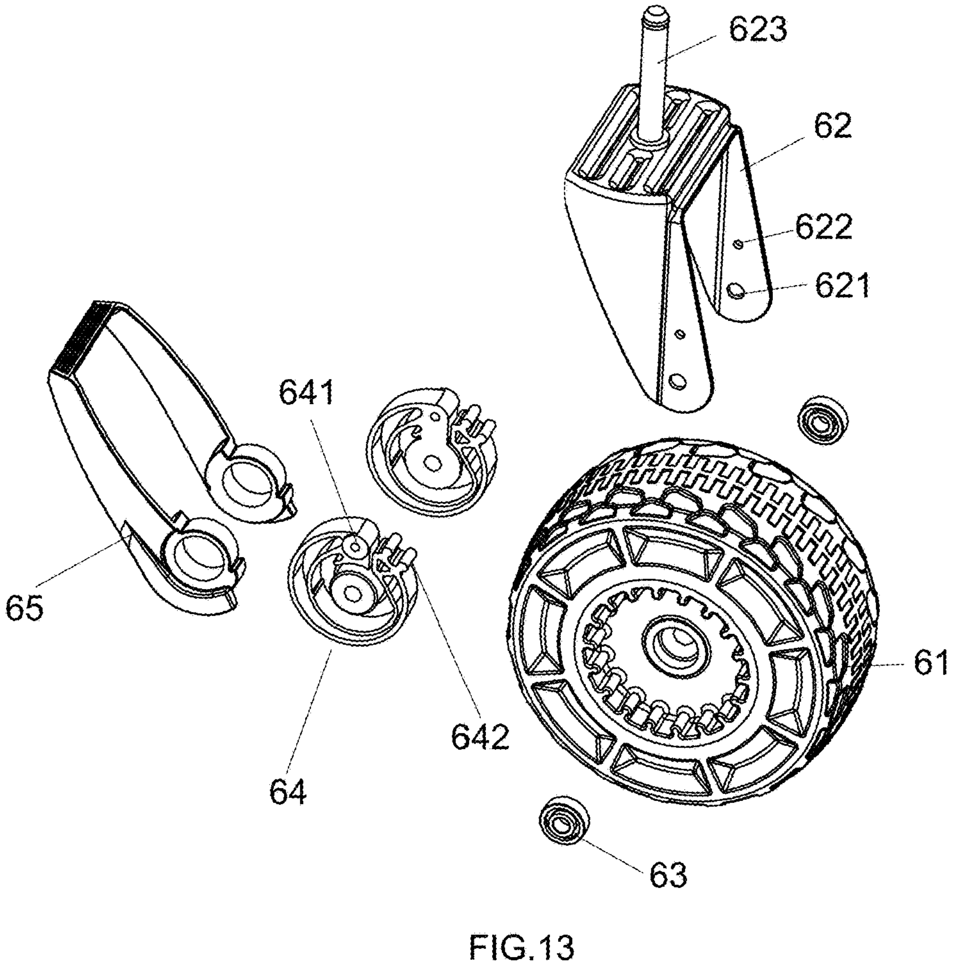
FIG. 13 is an exploded view of the FIG. 12.

As shown in FIGS. 12-13, each front universal wheel 6 comprises a universal wheel 61, a U-shaped universal wheel fork 62 with two prongs, a pair of bearings 63 and a brake mechanism; the bearings 63 are mounted inside a bearing hole formed at a center of the universal wheel 61; the brake mechanism comprises a U-shaped brake pedal 65 with two prongs and a pair of brake buckles 64, each brake buckle 64 is sleeved on one of two opposite sides of the universal wheel 61, the brake pedal 65 is connected to the pair of brake buckles 64; the universal wheel fork 62 has two punched holes 621 each arranged at a bottom of each prong of the universal wheel fork 62, the universal wheel 61, the pair of bearings 63, the brake buckle 64 and the brake pedal 65 are coaxially connected to the universal wheel fork 62 between the pair of punched holes; a rotating shaft 623 having an annular groove is disposed on a top of the universal wheel fork 62, a C-shaped clamping ring 620 clamps into the annular groove of the rotating shaft 623. During mounting, and each front universal wheel 6 is inserted into the shaft sleeve 830 of the corresponding vertical tube 83 through the rotating shaft 623 of the aforementioned front universal wheel 6, the C-shaped clamping ring 620 is bounced into a step hole in the shaft sleeve 830 for fixation. Thus, the rotating shaft 623 of the front universal wheel 6 is clamped in the shaft sleeve 830 and can rotate freely, and can be pulled out by applying a certain pulling force during disassembling, each brake buckle 64 has a positioning pore 641 at a top of the brake buckle 64, and the universal wheel fork 62 has two corresponding connecting pores 622 each arranged at a bottom of each prong of the universal wheel fork 62, so that each brake buckle 64 connects to each corresponding prong of the universal wheel fork 62 through a connecting member 200 connecting to on positioning pore 641 and the corresponding connecting pore 622, so that the brake buckle 64 will not rotate relative to the universal wheel fork 62 and both the universal wheel 61 and the brake pedal 65 can rotate freely.

Figure 14A:
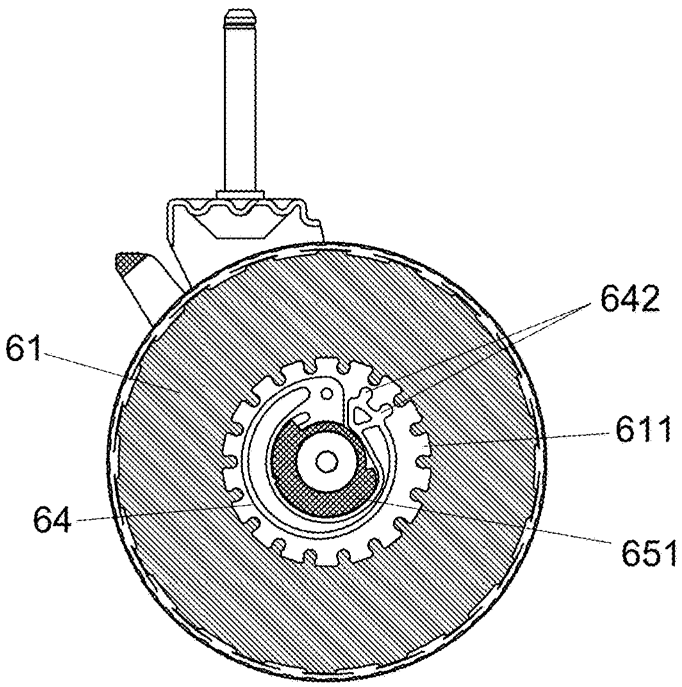
FIG. 14*a* is a sectional view of the front universal wheel when in an un-braked state showing how the front universal wheel brakes.
Figure 14B:
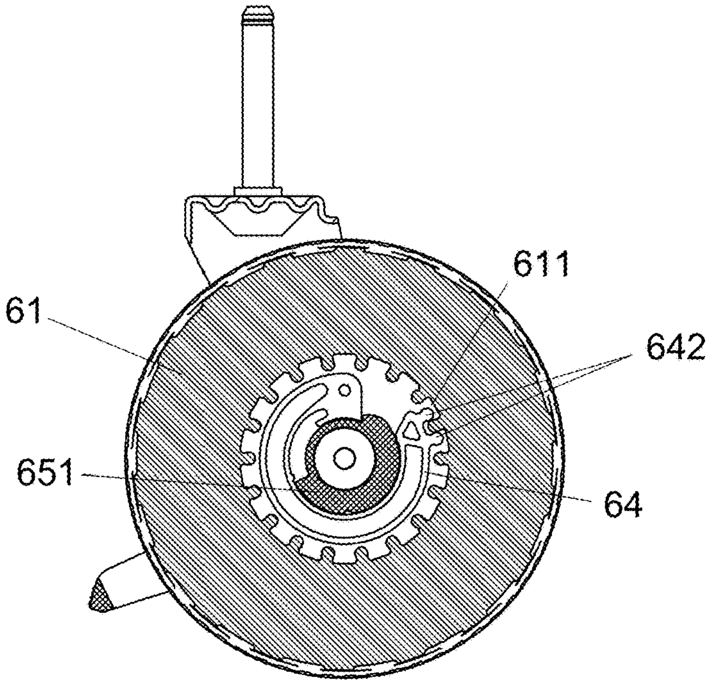
FIG. 14*b* is a sectional view of the front universal wheel when in a braked state showing how the front universal wheel brakes.

The braking mechanism will be given below. As shown in FIGS. 14*a*-14*b*, by stepping on the brake pedal 65 or pulling the brake pedal 65 with a hand, a cam 65 in a middle portion of the brake pedal 65 rotates to lift up an end of the brake buckle 64 with two protrusions 642 and the two protrusions 642 are inserted into a plurality of grooves 611 formed on a surface of the universal wheel 61, so that the universal wheel 61 is blocked and cannot rotate, thereby realizing braking.

Figure 15:
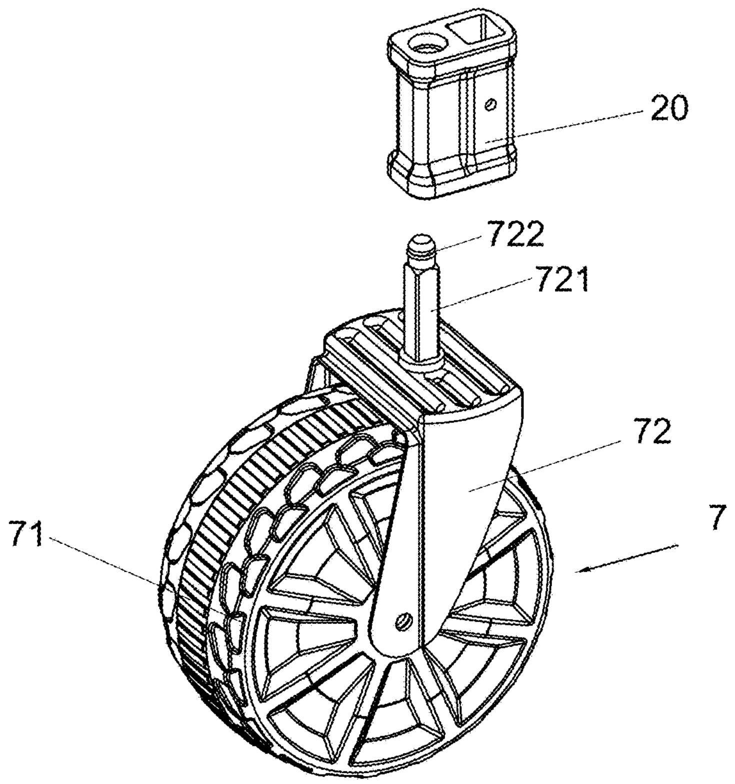
FIG. 15 is a perspective view of a rear directional wheel according to the embodiment of the present invention.
Figure 16:
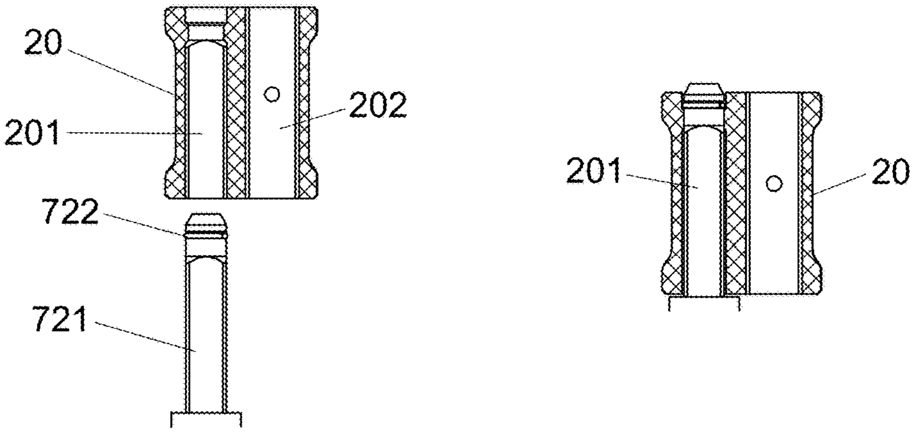
FIG. 16 shows two sectional views of a mounting block and a polygonal rotating shaft of the rear directional when they are apart and mounted together.

As shown in FIGS. 15-16, each rear directional wheel 7 comprises a directional wheel 71, a U-shaped directional wheel fork 72 with two prongs and a pair of bearings; the bearings are mounted inside a bearing hole formed at a center of the directional wheel 71; the directional wheel fork 72 has two punched holes each arranged at a bottom of each prong of the directional wheel fork 72, the directional wheel 71, the pair of bearings are coaxially connected to the directional wheel fork 72 between the pair of punched holes; a polygonal rotating shaft 721 having an annular groove is disposed on a top of the directional wheel fork 72, a clamping ring 722 clamps into the annular groove of the polygonal rotating shaft 721; each mounting block 20 is sleeved on the bottom of each vertical rod 21 of the rear frame 2, a positioning shaft sleeve 201 for allowing the polygonal rotating shaft 721 to pass through is located inside each corresponding mounting block 20, and, each rear directional wheel 7 passes through the polygonal rotating shaft 721 to be inserted and positioned into the positioning shaft sleeve 201 of the corresponding mounting block 20. The clamping ring 722 is bounced into to a step hole in the positioning shaft sleeve 201 for fixation, the polygonal rotating shaft 721 of the rear directional wheel 7 is clamped into the mounting block 20 and cannot rotate due to its polygonal profile, and the polygonal rotating shaft 721 of the rear directional wheel 7 can be pulled out by applying a certain pulling force during disassembling.

The storage bag 100 is detachably stretched on the cart frame A and fixed to top blocks 44 on the front frame 1 and the rear frame 2. Generally, connecting members 300 are arranged at four corners of the storage bag 100, and the storage bag 100 is fixed on top surfaces of the top blocks 44 through screws.

The specific mounting and use process will be given below:

I. Assembling the front universal wheels 6: the rotating shaft 623 of each front universal wheel 6 is inserted into the corresponding shaft sleeve 830 of the front connecting bar 8. Once the C-shaped clamping ring 620 is bounced into the step hole in the shaft sleeve 830, the front universal wheel 6 is clamped into the shaft sleeve 830 and can rotate freely at this time, and can be pulled out by applying a certain pulling force during disassembling.

II. Assembling the rear directional wheels 7: the polygonal rotating shaft 721 of each rear directional wheels 7 is inserted into the positioning shaft sleeve 201 of the rear wheel fixation blocks 20. Once the clamping ring 722 is bounced into the step hole in the positioning shaft sleeve 201, the rear positioning rotating shaft 721 of the rear directional wheels 7 is clamped into the corresponding mounting block 20 at this time and cannot rotate due to their polygonal profile, and the rear directional wheel 7 can be pulled out by applying a certain pulling force during disassembling.

III. Unfolding the cart frame A: the front frame 1 and the rear frame 2 are unfolded, the included angle between the front supporting frame 31 and the rear supporting frame 31 becomes larger, and the slider 45 is driven to slide upward. When the cart frame A is fully unfolded, the bottom supporting assembly 3 is resisted against the lower connecting bar 40.

IV: Operating the pulling rod assembly 5: the inner tube 52 is pulled out through the pulling handle 51 until the jumping bean 92 is clamped into the positioning hole 531 on the top end of the outer tube 53. At this time, the button 55 is pressed down to press the jumping bean 92 into the buckle 91, that is, the pulling handle 51 is pressed down to retract the inner tube 52 into the outer tube 53.

V: Braking mechanism: by stepping on the brake pedal 65 or pulling the brake pedal 65 with a hand, the cam 65 in the middle portion of the brake pedal 65 rotates to lift up the end of the brake buckle 64 with two protrusions 642 and the two protrusions 642 are inserted into the plurality of grooves 611 formed on the surface of in the universal wheels 61, so that the universal wheels 61 are blocked and cannot rotate, thereby realizing braking.

Figure 5:
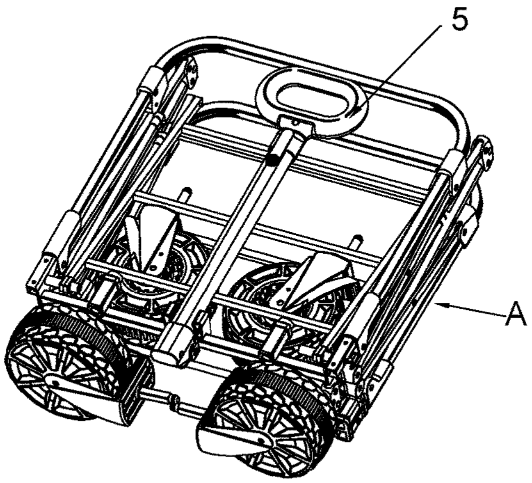
FIG. 5 is a perspective view of the FIG. 4 when the foldable cart is laid down.
Figure 6:
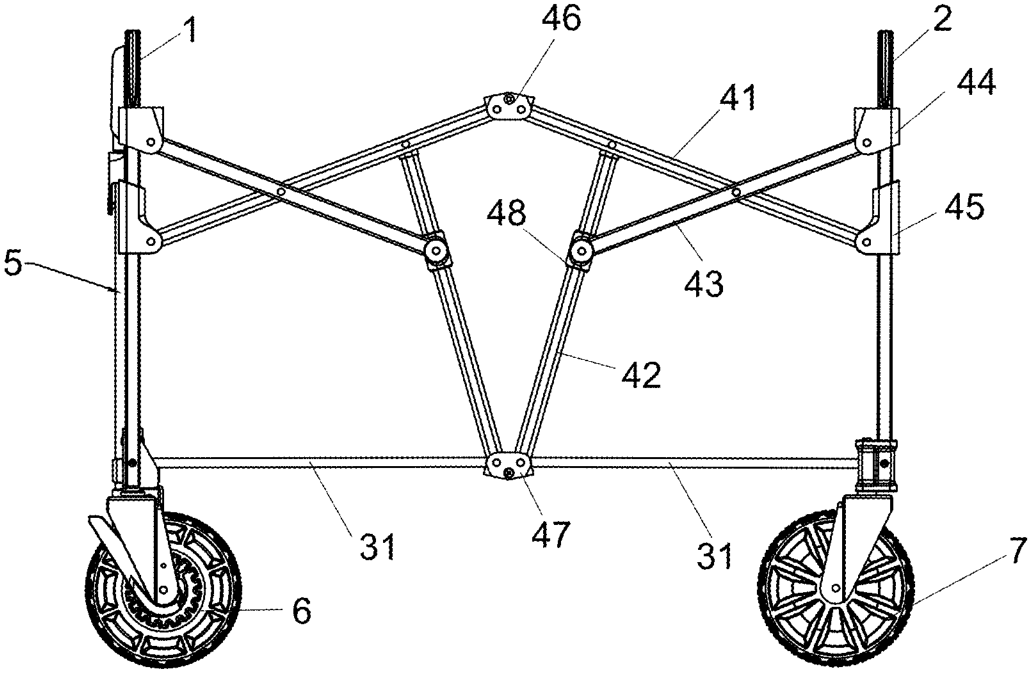
FIG. 6 is a front view of the FIG. 1 (the storage bag is removed)
Figure 7:
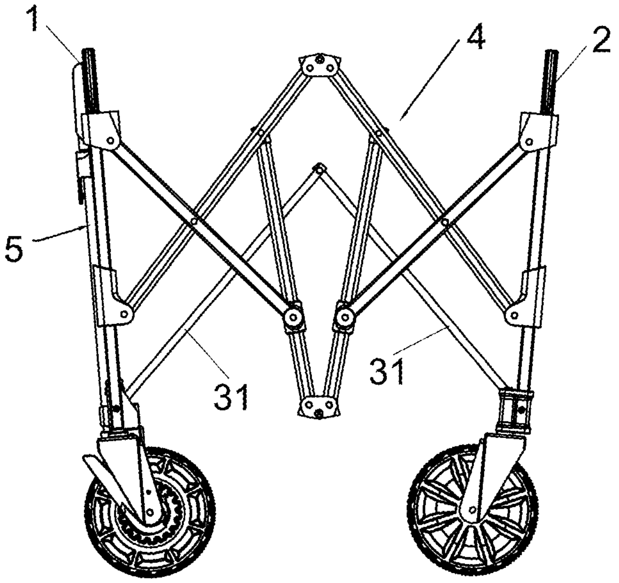
FIG. 7 is a front view of the foldable cart when the foldable cart is during being folded.
Figure 8:
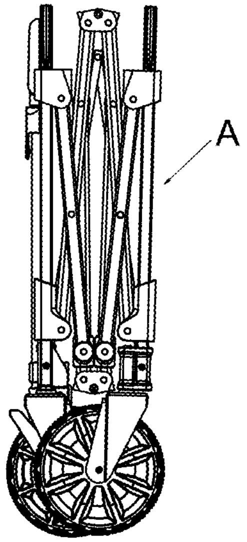
FIG. 8 is a front view of the foldable cart when the foldable cart is in a folded state.

During packaging and transportation, two wheels can be placed in the included angles of the folding bottom supporting assembly 3, and the other two wheels are placed under the bottom connecting bar 40 flatwise, so that the packaging is minimized (as shown in FIG. 5). The foldable cart of the present invention is simple and reasonable in structure, flexible and convenient to operate and use, small in size after folded and convenient to store and carry, and has advantages of small-size packaging, large capacity and high structural strength at the same time.

The protection scope of the present invention is not limited to each embodiment described in this description. Any changes and replacements made on the basis of the scope of the present invention patent and of the description shall be comprised in the scope of the present invention patent.

The invention claimed is:

1. A foldable cart, comprising:

a pulling rod assembly;

a foldable cart frame having a first side and a second side;

a plurality of wheels connected to the cart frame;

a storage bag connected to the cart frame;

wherein, the foldable cart frame comprises a front frame, a rear frame, two foldable fence assemblies respectively at the first side and the second side of the foldable cart frame and a foldable bottom supporting assembly having a front end and a rear end, the front frame and the rear frame are respectively connected to the front end and the rear end of the bottom supporting assembly;

each of the front frame and the rear frame has an inverted U-shape, and has a cross rod and two vertical rods which are respectively connected to ends of the cross rod on left and right sides of the frame cart corresponding to the aforementioned cross rod;

the bottom supporting assembly comprises a front supporting frame and a rear supporting frame which are pivoted together;

the front supporting frame and the rear supporting frame of the bottom supporting assembly are capable of unfolding into a rectangle supporting plane when the foldable cart is in an unfolded state;

each foldable fence assembly has a front end which is pivoted to the front frame and a rear end which is pivoted to the rear frame, the two fence assemblies are driven to fold or unfold when the bottom supporting assembly is folded or unfolded;

a front connecting bar is connected to a bottom of the front frame, and a bottom end of the pulling rod assembly is rotatably connected to a middle portion of the front connecting bar;

each vertical rod has a first mounting hole at a bottom end of the vertical rod, and each of the front supporting frame and the rear supporting frame has two corresponding second mounting holes which connect to a corresponding vertical rod, a plurality of connecting members respectively connects to the first mounting hole of one vertical rod and one corresponding second mounting hole of the front supporting frame or the rear supporting frame, so as to pivotally connect two vertical rods of the front frame to the front supporting frame, and pivotally connect two vertical rods of the rear frame to the rear supporting frame; and the front connecting bar comprises a long tube having two right-angle blocks a U-shaped clip and two vertical tubes welded on a surface of the long tube, the two right-angle blocks are welded on a left and right side of the long tube, respectively, each right-angle block connects to the bottom end of the corresponding vertical rod of the front frame, the U-shaped clip is welded below a middle portion of the long tube and a clip jaw is welded upon the middle portion of the long tube, a bottom end of the pulling rod assembly is pivoted to the U-shaped clip and positioned by the clip jaw, the two vertical tubes are welded on the long tube at positions between each right-angle block and the U-shaped clip, respectively; a shaft sleeve for mounting a corresponding front universal wheel is inserted into each vertical tube, each vertical tube has a cap at a top of the vertical tube and each cap buckles the corresponding shaft sleeve.

2. The foldable cart of claim 1, wherein each fence assembly comprises two long ribs, two short ribs and two branch ribs, a top block is arranged at a top of each vertical rod of the front frame and the rear frame, a slider being capable of moving along the vertical rod is sleeved on each vertical rod, a top end of each long rib is pivoted to a middle disc and a bottom end of each long rib is pivoted to the slider, a bottom end of each short rib is pivoted to a corresponding lower middle disc and a top end of each short rib is pivoted to a corresponding long rib, an oblique connecting block being capable of moving along the short rib is sleeved on each short rib, a top end of each branch rib is pivoted to the top block and a bottom end of each branch rib is pivoted to the oblique connecting block, a middle portion of each branch rib is pivoted to the corresponding long rib.

3. The foldable cart of claim 2, wherein each lower middle disc has a connecting hole on a surface of the lower middle disc, a bottom connecting bar is arranged below a middle portion of the bottom supporting assembly, two ends of the bottom connecting bar penetrate through the connecting holes of the lower middle discs, respectively, so as to connect the left and right fence assemblies, such that when the cart frame is fully unfolded, a bottom end of the bottom supporting assembly presses against the bottom connecting bar.

4. The foldable cart of claim 1, wherein the pulling rod assembly comprises a pulling rod joint, an outer tube, an inner tube and a pulling handle, the pulling handle fixedly connects to a top of the inner tube, the pulling rod joint fixedly connects to a bottom of the outer tube, the pulling rod assembly is pivoted to the U-shaped clip of the front connecting bar through the pulling rod joint, the inner tube is movably sheathed inside the outer tube, and, a locking mechanism is arranged between the inner tube and the outer tube.

5. The foldable cart of claim 4, wherein the locking mechanism comprises a buckle arranged on a surface of the bottom of the inner tube, the buckle has a step hole for allowing a jumping bean to pass through at a surface of the buckle, the inner tube has a through hole for allowing the jumping bean to pass through a surface of the inner tube, and the outer tube has a positioning hole for allowing the jumping bean to pass through a surface of a top end of the outer tube, a spring is supported between the jumping bean and the step hole of the buckle, urging the jumping beam to extend out of the positioning hole to lock the inner tube with the outer tube, a button for opening the locking mechanism is mounted on the top end of the outer tube, the button is sleeved on the top end of the outer tube and connects to the outer tube through a boss, one side of the button extends downward to form a button portion, and, the button portion on the surface of the outer tube corresponds to the position of the jumping bean.

6. The foldable cart of claim 1, wherein the plurality of wheels consists of four wheels, two wheels are a pair of front universal wheels and two wheels are a pair of rear directional wheels, the two front universal wheels detachably connect to the front connecting bar;

the rear frame has a pair of mounting blocks disposed on a bottom of the rear frame, and each rear directional wheel detachably connects to a corresponding mounting block.

7. The foldable cart of claim 6, wherein each front universal wheel comprises a universal wheel, a U-shaped universal wheel fork with two prongs, a pair of bearings and a brake mechanism;

the bearings are mounted inside a bearing hole formed at a center of the universal wheel;

the brake mechanism comprises a U-shaped brake pedal with two prongs and a pair of brake buckles, each brake buckle is sleeved on one of two opposite sides of the universal wheel, the brake pedal is connected to the pair of brake buckles;

the universal wheel fork has two punched holes each arranged at a bottom of each prong of the universal wheel fork, the universal wheel, the pair of bearings, the brake buckle and the brake pedal are coaxially connected to the universal wheel fork between the pair of punched holes;

a rotating shaft having an annular groove is disposed on a top of the universal wheel fork, a C-shaped clamping ring clamps into the annular groove of the rotating shaft, and each front universal wheel is inserted into the shaft sleeve of the corresponding vertical tube through the rotating shaft of the aforementioned front universal wheel;

each brake buckle has a positioning pore at a top of the brake buckle, and the universal wheel fork has two corresponding connecting pores each arranged at a bottom of each prong of the universal wheel fork, so that each brake buckle connects to each corresponding prong of the universal wheel fork through a connecting member connecting to on positioning pore and the corresponding connecting pore.

8. The foldable cart of claim 6, wherein each rear directional wheel comprises a directional wheel, a U-shaped directional wheel fork with two prongs and a pair of bearings;

the bearings are mounted inside a bearing hole formed at a center of the directional wheel;

the directional wheel fork has two punched holes each arranged at a bottom of each prong of the directional wheel fork, the directional wheel, the pair of bearings are coaxially connected to the directional wheel fork between the pair of punched holes;

a polygonal rotating shaft having an annular groove is disposed on a top of the directional wheel fork, a clamping ring clamps into the annular groove of the polygonal rotating shaft;

each mounting block is sleeved on the bottom of each vertical rod of the rear frame, a positioning shaft sleeve for allowing the polygonal rotating shaft to pass through is located inside each corresponding mounting block, and, each rear directional wheel passes through the polygonal rotating shaft to be inserted and positioned into the positioning shaft sleeve of the corresponding mounting block.

9. The foldable cart of claim 1, wherein the storage bag is detachably stretched on the cart frame and fixed to top blocks on the front frame and the rear frame.

* * * * *